(No Model.)
W. C. NYE.
DRIVEN WELL POINT.
No. 328,858. Patented Oct. 20, 1885.
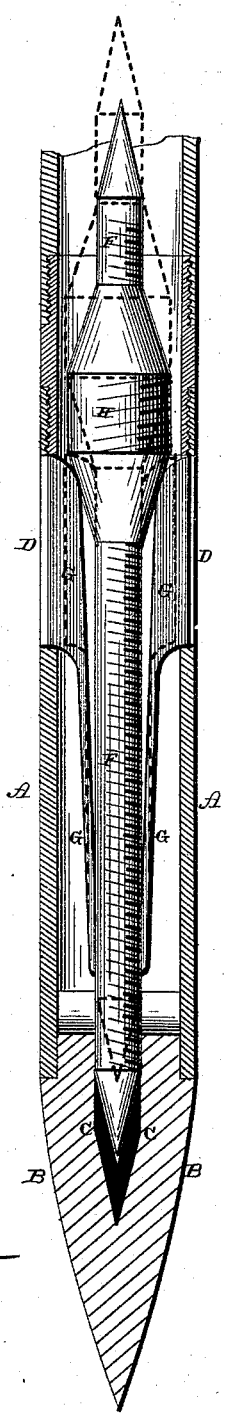
Witnesses—
R. F. Gardner
Jno. E. Prosperi.
Inventor—
Wm. C. Nye,
per F. A. Lehmann,
Atty.

UNITED STATES PATENT OFFICE.

WILLIAM C. NYE, OF BRADFORD, PENNSYLVANIA.

DRIVEN-WELL POINT.

SPECIFICATION forming part of Letters Patent No. 328,858, dated October 20, 1885.

Application filed June 2, 1885. Serial No. 167,386. (No model.)

*To all whom it may concern:*

Be it known that I, WILLIAM C. NYE, of Bradford, in the county of McKean and State of Pennsylvania, have invented certain new and useful Improvements in Driven-Well Points; and I do hereby declare the following to be a full, clear, and exact description of the invention, such as will enable others skilled in the art to which it pertains to make and use it, reference being had to the accompanying drawing, which forms part of this specification.

My invention relates to an improvement in driven-well points; and it consists in a hollow point having openings through opposite sides for the entrance of the water, in combination with a screw-rod which is screwed into the inside of the lower end of the point, the spring-closing devices which are connected to this rod, and a conical burr or nut which is placed upon the upper end of the rod, and which nut is made screw-threaded on its outer side, for the purpose of receiving an internally screw-threaded pipe or other device for either moving the burr vertically upon the rod or removing the rod and all of its attachments from the point, as will be more fully described.

The object of my invention is to provide a point for driven wells in which the openings for the admission of water can be kept tightly closed, for the purpose of preventing the entrance of dirt into the point, and which openings can be opened and closed by suitable means, which are placed entirely inside of the point, whenever so desired.

The figure represents a vertical section of a point embodying my invention.

A represents a driven-well point, which may either be made in a single piece or in two pieces, as may be desired. The lower solid point, B, as here shown, is made in a separate piece for the sake of being able to form the screw-socket C more readily in its upper end than can be done where the parts are formed in a single piece.

Near the upper end of the point, upon opposite sides, are formed openings D, of suitable length and width, for the admission of the water into the point.

Placed inside of the point A is the screw-rod F, which has a left-handed thread formed upon its lower end for the purpose of screwing it into the socket C and thus supporting the rod rigidly in position in the center of the point. Secured to opposite sides of this rod F are the closing devices G, which are made sufficiently elastic that when left free to move they hug tightly against the side of the rod F, so as to leave the openings D entirely clear for the admission of water, but which devices, when forced outward, are made to close the openings D, so as to prevent the admission of dirt into the point. These devices G close the openings D while the point is being forced into the earth, for the purpose of preventing dirt and other substances from being forced into the point to such an extent as to impede a free flow of water at any time.

Secured upon the upper end of the rod F is a conical nut, H, which is screw-threaded upon its inner side, so as to be moved up and down upon the rod, and which has a right-handed thread made in its outer surfaces, for the purpose of receiving the tool which is passed down through the casing for the purpose of operating it. This nut is made conical upon its lower end for the purpose of forcing the devices G outward, so as to close the openings D while the well is being driven, and for the purpose of excluding the dirt, as already described. When this nut H is raised upward upon the rod F, the upper ends of the devices G snap inward against the sides of the screw-rod F, so as to leave the holes D entirely clear. When the nut is forced downward, these devices G are made to close the openings D. After the point has reached the water, and it is desired to remove the rod F and all of its attachments, an internally-screw-threaded tool of any suitable construction is passed down through the casing and screwed upon the nut H, which has an external right-handed thread to receive the tool. By turning the tool until the nut is raised upon the rod F as far as it will go the strain is then transferred to the rod F, which causes its lower end to become detached from the socket C, and then the rod and all of its attachments are drawn upward, leaving the well perfectly clear.

Having thus described my invention, I claim—

1. The combination, with a driven-well point having suitable openings for the admission of water, of a rod, spring closing devices, and a nut placed upon the rod for operating the devices, substantially as shown.

2. The combination of the point A with a removable rod, F, the devices G, for closing the openings D in the point, and the conical nut, which is both internally and externally screw-threaded, substantially as set forth.

In testimony whereof I affix my signature in presence of two witnesses.

W. C. NYE.

Witnesses:
F. A. LEHMANN,
L. F. GARDNER.